United States Patent Office 3,180,897
Patented Apr. 27, 1965

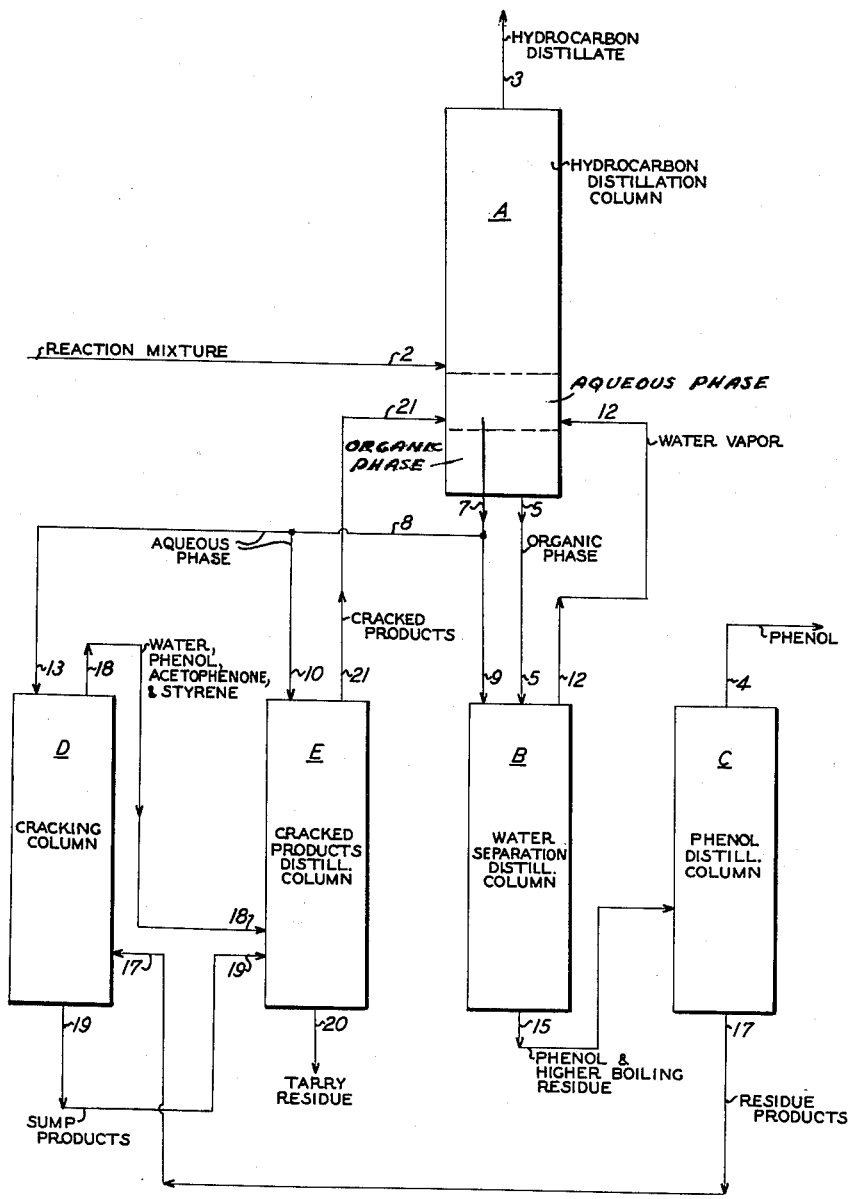

3,180,897
PROCESS FOR THE PRODUCTION OF PHENOLS
Heinrich Sodomann, Bruno Hauschulz, and Alfred Deka, Gladbeck, Westphalia, Germany, assignors to Phenolchemie G.m.b.H., Gladbeck, Westphalia, Germany, a German corporation
Filed July 11, 1960, Ser. No. 42,183
Claims priority, application Germany, July 15, 1959, P 23,176
7 Claims. (Cl. 260—621)

The present invention relates to the production of phenols and more particularly to a process for recovering phenol from the reaction mixture obtained by the catalytic acid cleavage of alkylated aromatic hydrocarbon hydroperoxide.

In accordance with the conventional phenol synthesis by means of acid cleavage of alkylated aromatic hydrocarbon hydroperoxide such as isopropylbenzene hydroperoxide, a cleavage reaction mixture is obtained which includes in addition to phenol and acetone, a number of further products. Among these further products for example are an α-methylstyrene, dimethylphenylcarbinol, acetophenone. Furthermore, in the reaction mixture a rather large amount of alkylated aromatic hydrocarbon unconverted in the oxidation reaction, such as isopropylbenzene, is also present. Besides the foregoing constituents, a residue of additional products having a higher boiling point than phenol and acetophenone is also present, this residue containing besides tarry products rather large amounts of p-cumylphenol.

In the conventional processing of the cleavage mixture to obtain pure phenol, the separation of the accompanying residual product causes considerable difficulties. Generally it is particularly difficult to separate predominantly the phenol from the residue such that the residue will contain only small amounts of phenol and other products which may be further utilized within the framework of the overall process.

In order to overcome the difficulties described, it has been proposed upon separation of the phenol from the constituents having a higher boiling point than phenol, to subject the remaining residue to temperatures of from 200–400° C. and to thereafter distill the products accumulating as the consequence of this temperature treatment. In this way the accumulating products including for example, methylstyrene, phenol and acetophenone, may be readily separated as low boiling materials from the higher boiling products in the residue. Such low boiling products may be thereafter separated in a further column such that a portion of the phenol and the methylstyrene distill off while the rest of the phenol and the acetophenone remain in the sump of the column. The sump mixture of acetophenone and phenol corresponds to an azeotropic mixture which may be thereafter separately processed to phenol only by resorting to comparatively cumbersome procedures. The distilled off phenol must be further separated from the accompanying methylstyrene in a further distilling column wherein the methylstyrene, i.e., α-methylstyrene is recovered from the head of the column, before the further processing and actual purification of the phenol.

In this conventional process a considerable reversion to cumylphenol occurs shortly after the cracking of the residue of methystyrene and carbinol so that the cracking effect is nullified to a rather large extent. Moreover, the low boiling constituents which are fed to the phenol distilling column lower the efficiency of separation of phenol from the other substances at this point. Most significant of all, by employing a cracking step as well as further separation columns for removing the low boiling constituents as well as other substances, such as methylstyrene, phenol and acetophenone, a substantial additional energy requirement is necessitated. The foregoing process described relates generally to the separation of phenol by the so-called dry process.

It is an object of the present invention to overcome the foregoing disadvantages and to provide a process for recovering phenol from the reaction mixture obtained by the catalytic acid cleavage of alkylated aromatic hydrocarbon hydroperoxides such as alkyl benzene hydroperoxide which is efficient in operation and economical to carry out.

Other and further objects of the invention will become apparent from a study of the within specification and examples taken in connection with the accompanying drawings.

It has been found in accordance with the present invention that an efficient and economical process for recovering phenol from the reaction mixture obtained by the catalytic acid cleavage of alkylated aromatic hydrocarbon hydroperoxide upon separating the acid catalyst and acetone present, may be provided wherein the hydrocarbon constituents of the reaction mixture having a boiling temperature below that of phenol are azeotropically distilled off with water in a hydrocarbon column, the remaining constituents are recovered from the sump of said column including an aqueous phase and an organic phase, the constituents in the recovered organic phase and in a portion of the recovered aqueous phase are separated from attendant water, and the separated constituents are distilled in a phenol distillation column. As a consequence phenol is recovered as a distillate and the residue is subjected to cracking in a cracking column while a portion of the recovered aqueous phase is passed to the cracking column. The cracked products and residue formed in the cracking column are distilled in a cracked products distillation column while a further portion of the recovered aqueous phase is passed to said cracked products distillation column. The low boiling cracked products may thereafter be recovered and recycled back into the hydrocarbon column for further processing.

In accordance with the preferred embodiment of the invention the attendant water present in the remaining constituents recovered from the hydrocarbon distillation column is separated in a water separation column for recycling in vapor form back to the hydrocarbon distillation column while the remaining constituents are passed to the phenol distillation column.

Significantly the temperature in the head of the cracking column is maintained at a temperature up to about 170° C. while the temperature in the sump is maintained between about 220°–350° C. and preferably about 270° and 290° C. On the other hand, the temperature in the head of the cracked products distillation column is maintained at 90–130° C. while the temperature in the sump is maintained at 200–215° C.

Specifically where isopropylbenzene hydroperoxide is the alkylated aromatic hydrocarbon hydroperoxide, the hydrocarbon constituents distilled off from the hydrocarbon column include isopropylbenzene and methylstyrene, while the residue from the phenol distillation column contains acetophenone, dimethylphenylcarbinol, cumylphenol as well as high boiling isopropylbenzene hydroperoxide polymerization and the condensation products. Cumylphenol is split and dimethylphenylcarbinol is dehydrated in the cracking column so that the cracked products passing to the cracked products distillation column include water vapor, phenol, α-methylstyrene and acetophenone. While the low boiling cracked products are returned to the hydrocarbon distillation column, the residue remaining in the cracked products distillation column including acetophenone and tarry products is recovered.

In accordance with the preferred embodiment of the invention the cracked products are passed from the cracking column to the cracked products distillation column without being previously condensed and in the same way the low boiling cracked products recovered from the cracked products distillation column are recycled to the hydrocarbon column without being previously condensed.

Thus in accordance with the present invention a so-called wet process in contrast to the so-called dry process is contemplated wherein the low boiling hydrocarbon compounds may be azeotropically distilled off with water from the phenol such that the overall energy requirement is comparatively less per unit of phenol obtained. The phenol is separated from the higher boiling components not distilled off in the hydrocarbon distillation column by a subsequent distillation. The residue therefrom contains acetophenone, dimethylphenylcarbinol as well as cumylphenol and other polymerization and condensation products. While the phenol recovered may be worked up in one or more after-connected distillation columns to pure phenol, the residue from the phenol distilling column is cracked in accordance with the invention under reflux of the aqueous phase from the hydrocarbon distillation column. The vapors from the cracking column are passed without condensation to the after connected cracked products distillation column, wherein they are distilled likewise under reflux of a portion of the aqueous phase from the hydrocarbon column. In this manner the acetophenone remains in the sump of this column while the vapors containing the low boiling cracked products are returned without condensation to the hydrocarbon distillation column.

Specifically after separating the acetone from the oxidation reaction mixture by distillation, the reaction mixture is subjected to azeotropic distillation with water in the hydrocarbon distillation column whereby primarily isopropylbenzene and styrene are recovered. In the sump of this column an upper aqueous phase containing slight portions of phenol and a lower organic phase containing the main portion of phenol and the total quantity of the residue constituents are formed.

The organic phase and a portion of the aqueous phase in accordance with the preferred embodiment of the invention pass to an after-connected column wherein the water is separated from the organic substances by distillation and recycled back to the hydrocarbon distillation column.

The organic phase is then passed to a crude phenol distillation column wherein the main portion of the phenol is distilled off for further processing to pure phenol. The residue remaining contains for example, about 15 to 25% phenol, 15 to 20% acetophenone, 12 to 18% carbinol, 15 to 25% cumylphenol and about 30% tarry products. In order to obtain the phenol contained in this residue the sump is fed to a cracking column wherein cracking temperatures maintained within a range of about 220°–350° C. and preferably 270°–290° C. In this manner all of the cumylphenol contained in the residue is split and the carbinol is dehydrated. Normal pressures, the vacuum pressures, and excess pressures may be used during this cracking step.

In connection with the cracking of the residue from the crude phenol distillation column, it is necessary on the one hand to employ suitable temperature for carrying out the cracking while on the other hand maintaining temperatures in the upper portion of the cracking apparatus such that a reflux is effected at as low a temperature as possible. For this purpose a portion of the aqueous phase from the hydrocarbon distillation column is passed to the head of the cracking column to provide a reflux for the cracking products. Consequently practically the entire amount of the decomposable materials such as dimethylphenylcarbinol and cumylphenol are cracked. The temperature in the head of the cracking column is advantageously maintained at a suitably low temperature in no case exceeding about 170° C. At higher temperatures in the head of the column, for example, 200° C., the main portion of the dimethylphenylcarbinol and also the cumylphenol will pass out of the cracking column without undergoing the desired cracking.

On account of the aqueous reflux from the hydrocarbon distillation column, no reversion to cumylphenol, for example, from methylstyrene and phenol will occur in the cracking column nor in the subsequently connected cracked products distillation column. In consequence of the aqueous reflux, a strong dilution of the reactive methylstyrene and phenol products is effected and additionally these reactive products are maintained at a comparatively low temperature. The accumulating vapors from the cracking column which include primarily water, phenol, methylstyrene, acetophenone and slight portions of hydrocarbons are conducted without intermediate condensation to the cracked products distillation column. In this way the energy expended in the cracking column may be completely and without loss utilized in the cracked products distillation column. The head temperature of the cracked products distillation column in this connection is maintained such that no acetophenone will pass with the distillate back to the hydrocarbon distillation column.

With respect to the cracking column, working temperatures are preferably chosen such that the residue which accumulates will be capable of being pumped. This is true at temperatures of above about 100° C. However, temperatures above about 300° C. result in extensive carbonization which renders necessary a continuous cleaning of the apparatus. The residue from the cracking column contains neither phenol nor other products which are further utilizable within the framework of the overall phenol process. This residue is pumped into the sump of the after-connected column such that a portion of heat energy contained in this residue is still capable of being utilized in the cracked products distillation column. Such residue, its energy spent, is drawn off from the cracked products distillation column. This residue at this point contains the total acetophenone present and only very slight quantities of phenol. This residue no longer contains substances further utilizable as a consequence of cracking technique. The acetophenone in this residue may be suitably retained since the same is liquid at room temperature.

As a consequence of employing in the cracked products distillation column comparatively low temperatures and a dilute aqueous phase reflux, no reversion of methylstyrene and phenol to cumylphenol will occur. The energy from the cracked products distillation column is conveniently employed by introducing the low boiling cracked products distilling off therefrom into the hydrocarbon distillation column without intermediate condensation. Thus the total energy employed in the cracking column as well as in the cracked products distillation column is completely utilized in the hydrocarbon distillation column. It will be appreciated in this connection that with respect to the total energy requirement, the cracking column and cracked products distillation column may be operated practically without any additional energy.

Advantageously in accordance with the present invention the hydrocarbons formed in the cracking operation may be returned in vapor form to the hydrocarbon distillation column without adding any additional burden to the overall operation. In this phase of the distillation operations such low boiling cracked hydrocarbons do not revert back to cumylphenol. Accordingly a very high grade product is obtained, i.e., phenol: German Pharmacopea No. 6, which in contrast to the conventional methods represents a yield increase of from 3 to 5%. Correspondingly the energy requirement is decreased in the order of 3 to 5% per unit of phenol recovered.

It will be appreciated that in accordance with the wet process advantage is taken of the phenomenon that hydrocarbons, for example, cumene and methylstyrene, from a low boiling pseudo-azeotrope with water, i.e., a two-substance system which acts like a true azeotrope, but wherein the constituents of the two-substance system are not mixable with one another as they are in a true azeotrope. Thus while the boiling point of pure cumene at normal pressure is 152° C., that of the pseudo-azeotrope of water/cumene under similar conditions is 98° C.

In accordance with the accompanying drawings the reaction mixture obtained from the acid cleavage of isopropylbenzene hydroperoxide, for example, is initially freed from the attendant acid catalyst and acetone and thereafter conveyed via line 2 to column A. In column A the hydrocarbon constitutents of the reaction mixture are azeotropically distilled with water from the remaining constituents including phenol. The hydrocarbon distillate leaving column A via line 3 includes constituents having a lower boiling point than phenol, i.e., isopropylbenzene, α-methylstyrene and water. In the sump of column A an upper aqueous phase containing a slight amount of phenol and a lower organic phase containing the major portion of the phenol as well as high boiling residue constituents and some water are obtained.

The lower organic phase is drawn off via line 5 and passes to the head of a water separation distillation column B. The aqueous phase from column A passes via line 7 and line 9 to the head of column B while a portion of the aqueous phase passes via line 8 and line 13 to the head of the cracking column D. A portion of the aqueous phase passing via line 8 however, is conducted via line 10 to the head of the cracked products distillation column E.

In column B the attendant water in vapor form is separated from the organic constituents and recycled via line 12 back to column A, preferably entering the same through the aqueous phase situated in the sump of column A. The sump products accumulating in the lower portion of column B upon removal of the water include for the most part phenol and higher boiling residue components. The phenol and higher boiling residue components are passed via line 15 to the phenol distillation column C. A substantial portion of the phenol is distilled off from the residue and passes from the head of column C via line 4 to a further column (not shown) wherein it is processed to pure phenol in the conventional manner. The residue from column C contains high boiling polymerization and condensation products, inter alia, cumyphenol, dimethylphenylcarbinol as well as phenol in an amount of for example, 27%. These products pass from the sump of column C via line 17 to the sump of cracking column D.

The sump portion of cracking column D is maintained at temperatures of from about 220°–350° C. and preferably from 270°–290° C. On the other hand, head portion of cracking column D is maintained at a temperature not in excess of about 170° C. in order to prevent the transformation of carbinol. The residue products from column C are converted in the sump of column D at the increased temperatures maintained therein to α-methylstyrene which is subsequently obtained as a distillate during the further course of the process via line 3 from column A. The α-methylstyrene upon subsequent hydrogenation to cumene may be recycled to the preliminary oxidation step for forming, for example, isopropylbenzene hydroperoxide. Cumylphenol and carbinol are transformed in cracking column D under the reflux of a portion of the aqueous phase from column A passing to the head of column D via line 13. From the head of cracking column D a mixture of water, phenol acetophenone and styrene in vapor form are passed via line 18 without prior condensation into the lower portion of cracked products distillation column E.

The sump product obtained in cracking column D which is capable of being pumped and which contains tarry constituents including from 0 to 1% phenol passes via line 19 to the lower portion of cracked products distillation column E. This tarry residue upon giving up its heat within column E passes via line 20 from the bottom of column E. This tarry residue contains up to about 8% phenol as well as the entire quantity of acetophenone (about 25%).

The temperature maintained in the head of column E is within the range of about 90°–130° while the temperature in sump of column E is maintained within the range of about 200°–215° C. In this way contamination of the vapors passing from the head of column E with acetophenone is prevented since a lower temperature is maintained at the head of column E than at the sump thereof. The products obtained from the head of column E are conducted without prior condensation via line 21 to the lower portion of column A to complete the cycle. The vaporous products passing via line 21 include low boiling vapors of cracked products containing an advantageous quantity of heat.

It will be appreciated that the water in vapor form which passes via line 12 back to column A contributes a certain amount of heat energy to the overall reaction. Conveniently in accordance with the process of the invention the same may be said for the residue passing from column C to the sump of column D. Moreover, the portion of the aqueous phase passing to the head of column D via line 13 and to the head of column E via line 10 serve to cool and purify the refluxing vapors and maintain the desired temperature along the course of the entire reaction. By passing the vapors from column D via line 18 to column E and by passing the vapors from column E via line 21 to column A, without prior condensation, an efficient utilization of the overall energy requirement is effected.

*Example 1*

In order to produce a commercially utilizable phenol of good quality, in accordance with the process as defined in the accompanying drawings the sump residue from the phenol distillation column C was drawn off and found to have the following composition:

| | Percent |
|---|---|
| Phenol | 20 |
| Acetophenone | 15 |
| Carbinol | 15 |
| Cumylphenol | 20 |
| Tar | 30 |

With respect to 1 ton pure phenol obtained, quantitatively 250 kg. of the foregoing residue composition contained the following specific amounts by weight:

| | Kg. |
|---|---|
| Phenol | 50.0 |
| Acetophenone | 37.5 |
| Carbinol | 37.5 |
| Cumylphenol | 50.0 |
| Tar | 75.0 |

The foregoing residue was conducted from the phenol distillation column C to the cracking column D and thence to the after connected cracked products distillation column E. In this manner 130 kg. of a residue per ton of pure phenol formed was obtained from the sump of column E via line 20. This residue had the following composition:

| | | |
|---|---|---|
| Phenol | 8.45 kg. | =6.5%. |
| Acetophenone | 36.4 kg. | =28.0%. |
| Carbinol | 6.5 kg. | =5%. |
| Cumylphenol | 2.6 kg. | =2%. |
| Tar | 76.05 kg. | =58.5%. |

The overall operation was conducted in accordance with the manner described with specific reference to the accompanying drawings wherein the various temperatures were maintained in the various parts of the columns as noted above. By means of vapor phase passage of constituents from one column to another, it is seen that the overall operation may be carried out without an increase in total distillation energy. Moreover, in accordance with the process of the invention, the entire distillate obtained from cracking column D and cracked products column E may be processed in the usual distillation apparatus without encountering any quality reductions. This is clearly evidenced by comparing the residue obtained from the phenol distillation column C with that obtained from line 20 of column E.

What is claimed is:

1. Process for recovering phenol from the reaction mixture obtained by the catalytic acid cleavage of alkylated aromatic hydrocarbon hydroperoxides after separating the acid catalyst and acetone present, which comprises azeotropically distilling off with water the hydrocarbon constituents of such reaction mixture having a boiling temperature below that of phenol in a hydrocarbon column, recovering the remaining constituents from the sump of said column including an aqueous phase and an organic phase, separating the constituents in the recovered organic phase and in a portion of the recovered aqueous phase from attendant water by distilling off the water therefrom, distilling the residue constituents remaining after said distilling off of the water from said organic phase and from said portion of the recovered aqueous phase in a phenol distillation column to distill off phenol, recovering phenol as a distillate and cracking the residue from the phenol column in a cracking column having a head temperature from at least above the boiling temperature of water under the reaction conditions up to about 170° C. and a sump temperature between about 220–350° C. while passing another portion of the recovered aqueous phase from the hydrocarbon column to the head of said cracking column as reflux in an amount sufficient to substantially dilute and cool the vaporous constituents in the head of said cracking column, distilling the cracked products and residue formed in said cracking column in a cracked products distillation column having a head temperature between about 90 and 130 degrees C. and a sump temperature between about 200 and 215 degrees C. while passing a further portion of the recovered aqueous phase from the hydrocarbon column to the head of said cracked products distillation column as reflux in an amount sufficient to substantially dilute and cool the vaporous constituents in the head of said cracked products distillation column, and recovering and recycling the low boiling cracked products from the cracked products distillation column back to the hydrocarbon column.

2. Process according to claim 1 wherein the distilling off said attendant water from said phases is carried out in a water separation distillation column and said water is recycled in vapor form back to the hydrocarbon column.

3. Process according to claim 1 wherein the alkylated aromatic hydrocarbon hydroperoxide is isopropyl benzene hydroperoxide, the hydrocarbon constituents distilled off from the hydrocarbon column include isopropyl benzene and methyl styrene, the residue from the phenol distillation column contains acetophenone, dimethylphenylcarbinol, cumylphenol, and high boiling isopropyl benzene hydroperoxide polymerization and condensation products, cumyl phenol is split and dimethylphenylcarbinol is dehydrated in the cracking column, the cracked products distilled in the cracked products distillation column include water vapor, phenol, methyl styrene and acetophenone, and the residue remaining in the cracked products distillation column includes acetophenone and tarry products.

4. Process according to claim 1 wherein the cracked products are passed to the cracked products distillation column without being previously condensed, and the low boiling cracked products recovered from the cracked products distillation column are recycled to the hydrocarbon column without being previously condensed.

5. Process for the recovering phenol from the reaction mixture obtained by the catalytic acid cleavage of alkylated aromatic hydrocarbon hydroperoxides after separation of the acid catalyst and acetone present, which comprises distilling such reaction mixture in a water vapor hydrocarbon azeotropic distillation column, recovering the hydrocarbon constituents having a boiling temperature lower than that of phenol with water in vapor form from the top of said hydrocarbon distillation column, withdrawing the remaining constituents, which form an upper aqueous phase and a lower organic phase in the sump of said column, from the sump of said hydrocarbon distillation column and distilling said remaining constituents including a first organic phase and the major portion of the aqueous phase in a water separation column, recycling the separated water in vapor form from the water separation column back to the upper aqueous phase in the sump of the hydrocarbon distillation column, withdrawing the separated organic phase including phenol and constituents substantially having a boiling temperature higher than that of phenol which passes to the sump of said water separation column and distilling said phase in a crude phenol distillation column, recovering the major portion of the phenol present from the top of said crude phenol distillation column, withdrawing the remaining residual constituents substantially having a boiling temperature higher than that of phenol which pass to the sump of said crude phenol distillation column and cracking said residual constituents in a cracking column having a head temperature from at least above the boiling temperature of water under the reaction conditions up to about 170° C. and a sump temperature between about 220–350° C. while passing a separate second minor portion of the aqueous phase withdrawn from the sump of said hydrocarbon distillation column to the top of said cracking column as reflux in an amount sufficient to substantially dilute and cool the vaporous constituents in the head of said cracking column, withdrawing the vaporous constituents from the top of said cracking column and the liquid constituents from the sump of said cracking column and distilling said constituents in a low boiling cracked products separation column having a head temperature between about 90 and 130 degrees C. and a sump temperature between about 200 and 215 degrees C. while passing a separate third minor portion of the aqueous phase withdrawn from the sump of said hydrocarbon distillation column to the top of said cracked products separation column as reflux in an amount sufficient to substantially dilute and cool the vaporous constituents in the head of said cracked products separation column, recycling the vaporous low boiling cracked products from the top of said cracked products separation column back to the upper aqueous phase in the sump of said hydrocarbon distillation column and recovering the residue cracked products from the sump of said cracked products separation column.

6. In the process for recovering phenol from the reaction mixture obtained by the catalytic acid cleavage of alkyl benzene hydroperoxide, in which the reaction mixture, after removal of the acid catalyst and acetone present, is azeotropically distilled with water to remove the hydrocarbon components in vapor form from the higher boiling components and phenol which form an aqueous and organic phase residue, the phenol is preponderantly recovered from the higher boiling components and water in the residue by subsequent distillation, and the higher boiling components are thereafter cracked at higher temperatures, the improvement of cracking said high boiling components in a cracking column having a head temperature from at least above the boiling temperature of water under the reaction conditions up to about 170° C. and a sump temperature between about 220–350° C. under reflux of a separate portion of the aqueous phase of the residue forming upon the azeotropic distillation of the hydrocarbon components, said separate portion-reflux being used in an amount sufficient to substantially dilute and cool the cracked product vapors in the head of the cracking column, passing the cracked product vapors and the sump residue obtained in the cracking column directly to a cracked products distillation column, thereafter distilling in said cracked products distillation column having a head temperature between about 90–130° C. and a sump temperature between about 200–215° C. the cracked products vapors under reflux of a further separate portion of the aqueous phase of the residue forming upon said azeotropic distillation, said further separate portion-reflux being used in an amount sufficient to substantially dilute and cool the low boiling cracked product vapors in the head of the cracked products distillation column, and recycling without condensation the low boiling cracked product vapors thereby distilling off back to the azeotropic distillation with water.

7. Improvement according to claim 6 wherein the remainder of the aqueous phase, apart from said separate and further separate portions of said aqueous phase, and said organic phase of the residue forming upon said azeotropic distillation are distilled to separate the water content therefrom, said water content being recycled to the azeotropic distillation.

References Cited by the Examiner

UNITED STATES PATENTS 2,720,549  10/55  Armstrong et al. _____ 260—621

FOREIGN PATENTS 514,336  7/55  Canada.

LEON ZITVER, *Primary Examiner.*

CHARLES B. PARKER, *Examiner.*